May 23, 1944.  C. F. WEINREICH ET AL  2,349,780
AUTOMATIC BOTTLE FILLING APPARATUS
Filed March 1, 1940  3 Sheets-Sheet 1
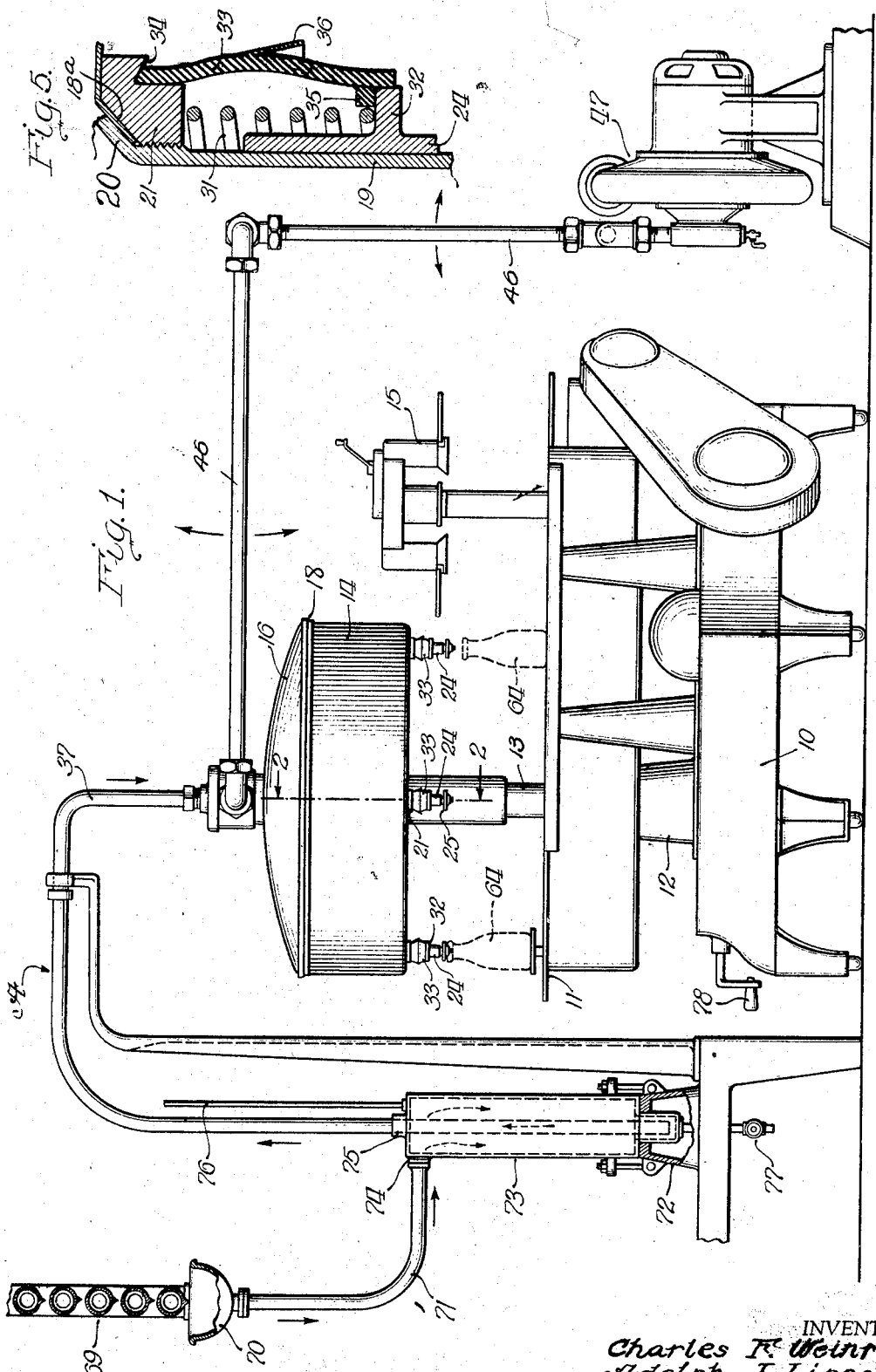
INVENTORS.
Charles F. Weinreich
Adolph J. Lippold
By: Norman E. H. Weltzke
ATTORNEY.

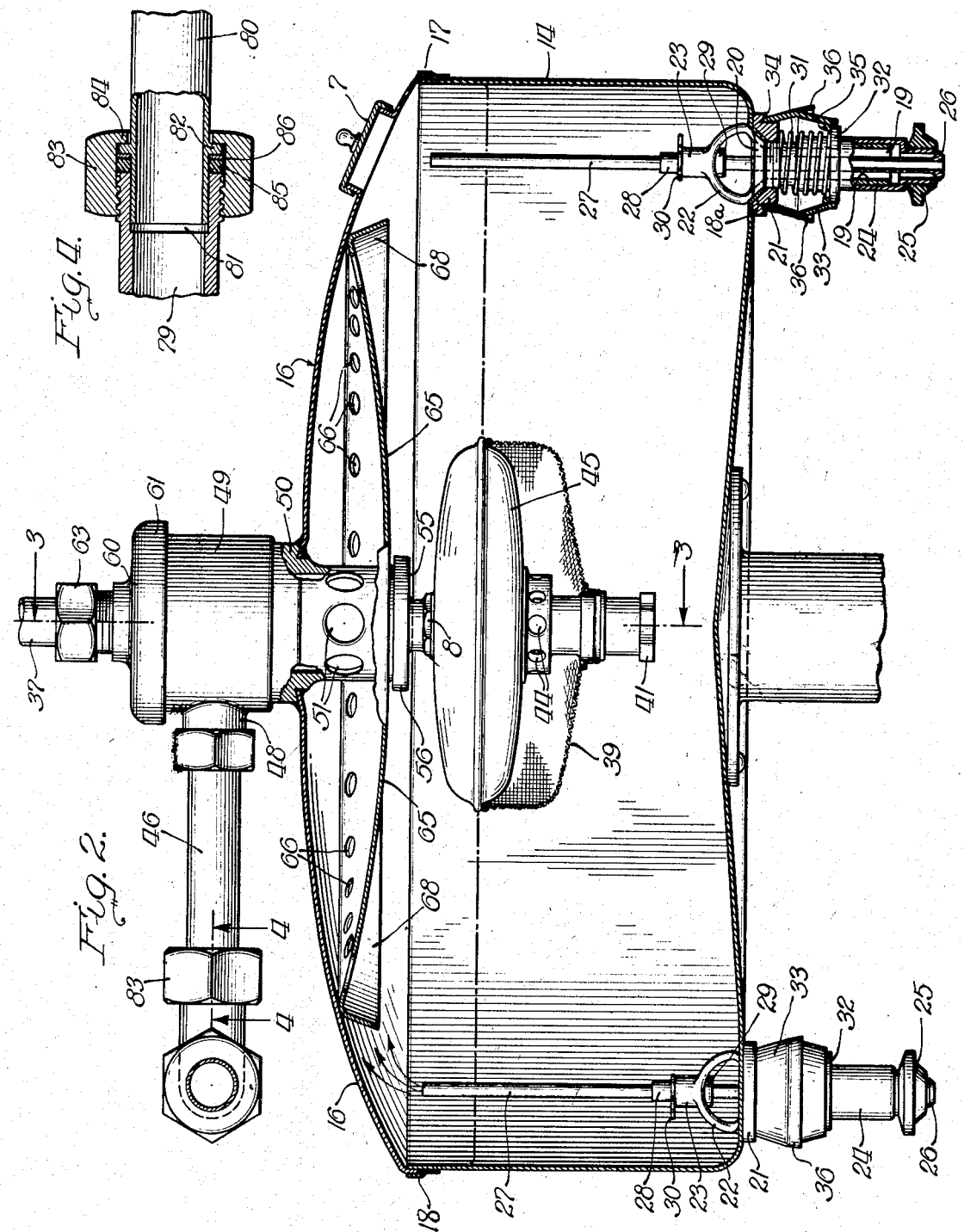

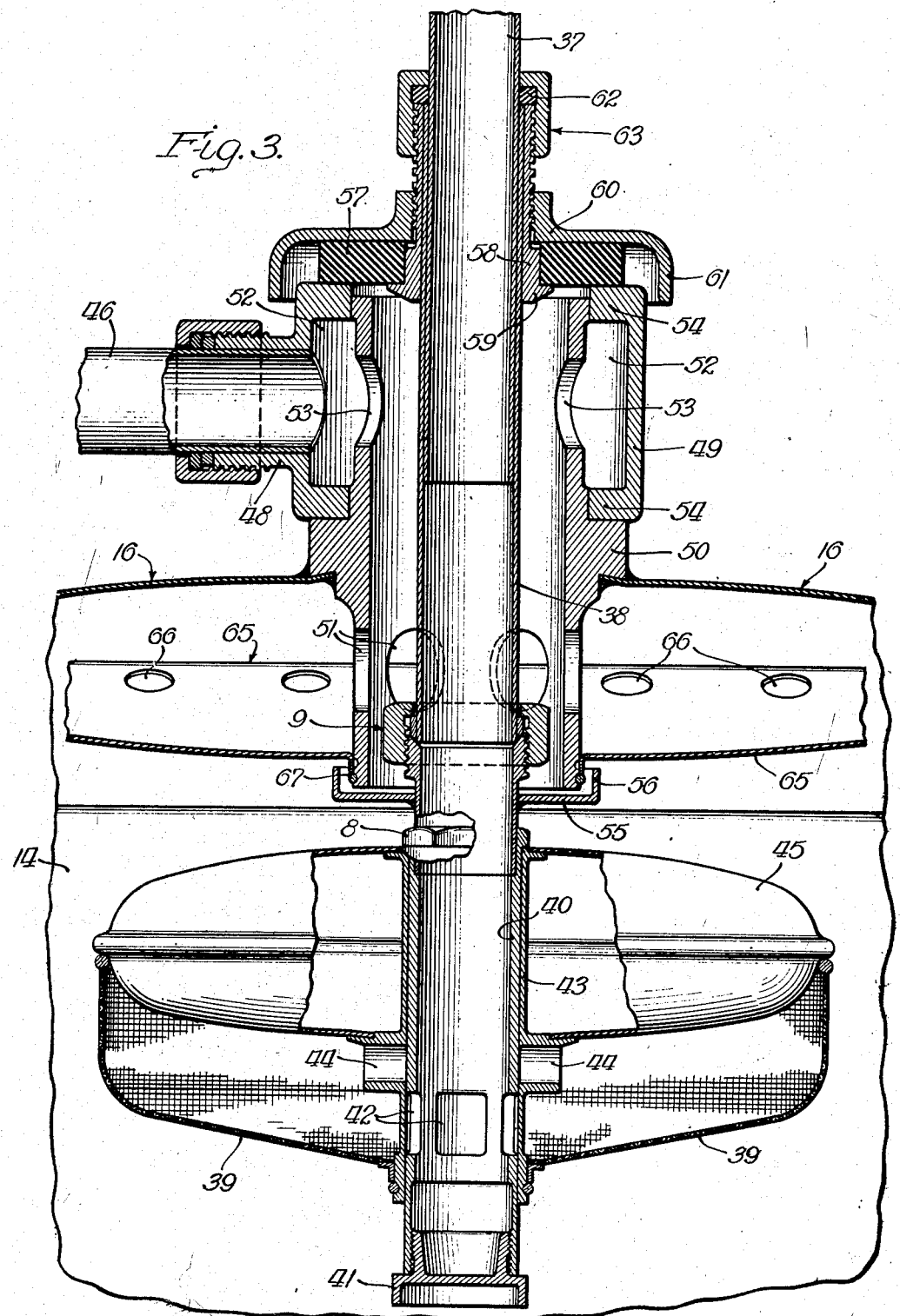

Patented May 23, 1944

2,349,780

UNITED STATES PATENT OFFICE 2,349,780

AUTOMATIC BOTTLE FILLING APPARATUS

Charles F. Weinreich, Des Plaines, Ill., and Adolph J. Lippold, Milwaukee, Wis., assignors to Cherry-Burrell Corporation, Wilmington, Del., a corporation Application March 1, 1940, Serial No. 321,682

29 Claims. (Cl. 226—116)

This invention relates to apparatus for filling bottles. More particularly, the invention relates to a rotary bottle filler and associated mechanism in which the liquid flowing from the filler bowl flows primarily under the effect of gravity into partially evacuated bottles.

In bottle fillers, such as, for example, rotary milk bottle fillers of the type included in this invention, there is a tendency to produce foam within the partially evacuated reservoir, especially when the milk is particularly cold. Such foaming is partially caused by the filling of the milk into bottles or containers from the partially evacuated rotary supply tank from which it flows by gravity through closable bottle venting valve mechanisms into partially evacuated bottles from which air and entrained liquid is vented into the space above the liquid in the reservoir.

In such combined gravity and vacuum fillers as just referred to above, a commonly experienced difficulty is the formation of sufficient foam within the partially evacuated supply tank or reservoir which seriously interferes with the satisfactory evacuation of air from the reservoir by being drawn into the exhaust line and passing therefrom into the vacuum pump. That is, of course, an undesirable characteristic in that it is wasteful and very unsanitary.

As above stated, part of the foam within the partially evacuated reservoir may be caused as a result of the inflowing air and entrained liquid passing into the partially evacuated reservoir through the venting means of the filling valves. However, not all of the foam within the partially evacuated supply reservoir is formed incidental to the filling operation. A portion of the foam normally formed within the filler reservoir may result from the expansion of the entrained air in the milk supplied to the reservoir from the milk cooling mechanism.

In the combined gravity-vacuum fillers of the type disclosed in this application the milk is normally fed to the containers through reciprocable sleeve valves positioned at the bottom of the supply reservoir. The valves so positioned are normally exposed to the contaminated condensate collecting and draining from the cool outer surface of the supply tank. Such contaminated condensate may, when the valve sleeves are sufficiently loose one upon another, be drawn into the interior of the valve through the sleeve joint, thereby contaminating the milk or other liquid flowing through the valve.

It is, therefore, the prime object of this invention to provide a bottle or container filling apparatus of the class described in which the foaming of the milk or other liquid being filled is reduced to a minimum; in which the greater portion of the foam is quickly broken up and reduced to freely flowing liquid upon the formation of the foam within the supply reservoir; in which the passage of foam or entrained liquid into the air exhaust line evacuating the supply tank is substantially avoided; and in which the air withdrawn from the supply tank is withdrawn at comparatively low velocities from portions of the evacuated reservoir where there exists the least possibility of entraining foam or liquid.

A further object of the present invention is to provide a permanent liquid seal and air trap and entrapped air venting mechanism in the milk supply line which supplies milk from the cooling mechanism to the supply reservoir of the bottle filler.

An additional object of this invention is to provide means associated with the bottle or container filling valves, or, more properly stated, to provide a filling valve in which condensate collecting on the cool outer surface of the supply tank or on the surface of portions of the valve may not enter into the valve mechanism through openings therein, such as telescoping sleeves, to contaminate the liquid passing therethrough, and in which parts of the valve assemblage become so arranged, upon opening of the valve, as to constitute a substantial protective covering for the portion of the valve engaged by the mouth of the container to be filled.

Other important features of this invention are to provide a filler and associated mechanism of the type disclosed in which is provided a sanitary, easily demountable liquid supply and air discharge mechanism which may be readily cleaned and which may easily and without substantial alterations be assembled onto the reservoirs of the majority of the conventional types of rotary gravity bottle fillers having vented filling valves to convert the mechanism into a combined gravity-vacuum filler; in which the air exhaust line is provided with easily assembled, sanitary, swiveled joints to facilitate the ready adjustment of the liquid reservoir incidental to the necessary adjustment for filling larger or smaller containers; in which the stationary conduit supplying liquid to the bottle filler supply tank is so joined to float-controlled discharge valves and to the sealed partially evacuated supply reservoir as to permit a slight disalinement between the stationary supply conduit and the rotary supply tank; and in which the float valve is so joined to the enclosed reservoir as to be automatically adjustable in elevation with the reservoir.

In a bottle or container filling apparatus constructed in accordance with this invention it is possible to more rapidly fill liquid, particularly viscous liquid, into the containers due to the partial evacuation of the air from the containers or bottles. As will be later pointed out in detail, such evacuation of the bottles or containers is brought about by the evacuation of air therefrom through the bottle venting means associated with the filling valves and operatively connected with the evacuated space in the partially evacuated supply tank.

Due to the partial vacuum applied to the space above the liquid in the supply tank or reservoir, which is sufficiently great as to prevent liquid from discharging from the filling valves when open to atmospheric pressure, bottles which do not seal against the temporary closure of the filling valve will not be partially evacuated through the venting means of the filling valve and consequently liquid will not be discharged into such bottles. From those bottles or containers, however, in which liquid is discharged, the excess liquid is drawn up through the venting means of the filling valve and returned to the supply tank or reservoir.

In the normal process of filling a bottle or container, since it is filled by gravity flow due to the fact that the pressure within the container is the same as the pressure above the liquid by virtue of the connection between these two spaces through the vent tube, the liquid will tend, after the bottle is filled, to rise in the vent tube to the level of the liquid in the supply reservoir. When the filled bottle is being removed from the filling valve and the seal between the bottle mouth and the temporary closure of the valve broken, the excess quantity of the liquid which has entered the venting means in the manner as just set forth, together with the excess liquid in the neck of the bottle, will be quickly drawn into the supply tank through the vent tube by the in-rushing air. Such drawing of all such excess liquid back into the supply tank by means of suction prevents the undesirable dripping of milk from the valve mechanism and out of the vent tube onto the remainder of the filling apparatus, thereby eliminating undesirable unsanitary conditions and waste.

The foregoing and other objects, important features and advantages will be apparent to those skilled in the art upon examination of the details of construction and arrangement of the various combinations as disclosed in the description, appended claims and accompanying drawings in which:

Figure 1 is a view partially in rear elevation of a bottle filler and capper and associated mechanism embodying the invention, together with a side elevation partially in broken away section of a vacuum pump, liquid and air seal for a supply line and liquid cooler, and associated swiveled conduit connections.

Figure 2 is an enlarged view partially in cross section taken along the line 2—2 of Figure 1 of the supply reservoir of the bottle filler and associated bottle filling valves, float valves and gas deflecting member within the supply reservoir, and associated gas discharge connections.

Figure 3 is an enlarged detail view in axial section taken along the line 3—3 of Figure 2 through the stationary liquid supply line and float valve connection and the cooperating rotary air exhaust coupling.

Figure 4 is a longitudinal view taken along the line 4—4 of Figure 2 of an axial section of a sanitary swiveled conduit coupling.

Figure 5 is a partial view taken along an axial plane of a filling valve and associated elastic sealing jacket.

Referring to the drawings in which like parts are identified by like numerals throughout the several views, 10 designates a bottle or container filler base upon which is supported a rotary turntable 11 upon a hollow upright 12 through which extends an adjustable, concentric, rotary filler reservoir support 13 vertically adjustable with respect to the turntable 12 and upon which the filler reservoir or tank 14 is supported. Also supported upon the base 10 is a suitable automatic bottle capping mechanism generally indicated by the numeral 15 which is synchronized with and operatively connected to the turntable 11 and between which mechanism is provided the necessary suitable inter-connecting conveying mechanisms (not shown in detail), all of which are powered and actuated through suitable drive and power units housed in the base 10.

The tank or reservoir 14 is provided with a domed centrally apertured closure 16 having an inspection opening sealed by the inspection opening closure 7 and also having a depending flange or skirt 17 to telescopically fit over the upper edge of the reservoir 14. To seal the closure skirt 17 to the wall of the reservoir 14, an elastic band 18 is provided which, when tightly stretched over the juncture of the edge of the skirt 17 and the adjacent portion of the wall of the tank 14, sealingly engages both elements to thereby completely seal the space enclosed by the reservoir 14 and closure 16.

The bottom of the supply reservoir 14 is provided with a series of filler valve openings having depending flanges 18a. In each such opening is inserted the liquid or milk discharge tube 19 of a bracket which includes a plug portion 20 seated internally upon the flange 18a. A clamping nut 21 threaded to the upper portion of the tube 19 adjacent the juncture thereof with the plug 20 engages the flange 18 externally to hold the bracket rigidly but demountably assembled upon the bottom of the reservoir 14. The bracket element of the filling valve assemblage also includes a spider having arms 22 and a socket element 23.

Slidably mounted upon the outer periphery of the tube 19 is a valve sleeve 24 carrying a bottle-engageable, bottle-actuatable and temporary sealing element 25. The sleeve 24 provides at its lower edge a seat for the centrally apertured valve element 26 which is carried by a tubular valve and venting stem 27. The lower end of the tubular vent stem 27 is sealed to the upper side of valve 26 about the aperture therethrough. Such construction enables the tubular valve stem 27 to also serve as a vent or conduit for withdrawing air from a bottle or container sealingly engaging the temporary closure 25.

The tubular vent stem 27 extends upwardly through the socket 23 into the interior of the reservoir 14 to a point above the maximum normal liquid level therein. The construction affords a satisfactory means for venting air from a container or bottle engaging the temporary closure 25 into the space in the partially evacuated reservoir 14 above the liquid level therein. To maintain the valve stem in operative position It is provided with a spacer collar 28 fixed to the outer periphery of the tube 27 and adapted to fit snugly into the socket element 23. The spacer collar has a flange 29 engaging the lower portion of the socket element 23 and a removable clip ring 30 engages grooves (not shown) in the collar 28 above the socket element 23 and abuts against the upper edge of the socket element 23 to thereby rigidly but removably hold tube 27 and valve 26 in operative position.

A compressed spring 31 is superimposed over the telescopically arranged tube 19 and sleeve 24 intermediate the nut 21 and a flange 32 on the outer periphery of the sleeve 24 to maintain the lower end of the sleeve 24 in sealing engagement with the valve 26. To prevent contaminated condensate which may form on the outer surface of the reservoir 14 and exposed portions of the valve assemblage from draining over the portion of the telescopically arranged tube 19 and sleeve 24 at the point of juncture thereof or other portions of the valve through which condensate may be drawn into the valve due to the vacuum within the reservoir 14, a deflecting and sealing sleeve 33 of resilient material is provided. The sleeve 33 may be of straight tubular construction but preferably may be constructed as disclosed in the figures in such a manner that its largest diameter is approximately at the midsection of the sleeve. The upper and lower extremities of the sleeve 33 are tightly but removably fitted in sealing telescopic arrangement over the adjacent portions of the nut 21 and the flange 32, respectively.

The nut 21 is provided with an outwardly extending undercut shoulder 34 against which the upper end of the resilient sleeve 33 abuts but which overhangs the sleeve sufficiently so as to direct draining condensate away from the juncture of the upper end of the sleeve 33 and the shoulder 34. An internal flange 35 of substantially less elastic qualities than the remainder of the sleeve 33 is provided adjacent the lower edge of the sleeve 33 and, when the sleeve is assembled on the valve mechanism, the flange 35 abuts against the top surface of the flange 32 on the outer periphery of the valve sleeve 24.

The abutment of the upper end of the sealing sleeve 33 against the undercut shoulder 34 and the abutment of the substantially inelastic flange 35 against the flange 32 prevents the sleeve 33 from becoming displaced from its intended operative position when the valve mechanism is actuated during the bottle filling operations. It should, however, be commented at this point that it is not necessary that the flange 35 be entirely inelastic in that it is only essential that it be sufficiently inelastic so as to prevent it from stretching and sliding over the flange 32 during the compression of the valve mechanism.

At its widest diameter sleeve 33 is also provided with an outwardly extending condensate deflector 36. The deflector 36 may be formed integrally with the sleeve 33 and will deflect condensate draining over the sleeve 33 and cause it to drip therefrom at a point remote from the valve opening adjoining the valve member 26.

When the valve mechanism is compressed and the sleeve 33 expands at its greatest diameter, a formation thereof is thereby secured which will constitute a complete guard for the portion of the valve which contacts the bottle to be filled, providing a satisfactory protective shield for the entire region occupied by the bottle as it passes into and away from the filling valve during the automatic operation of the bottle filling mechanism.

The liquid, such as milk, to be filled into the containers is supplied to the reservoir 14 through conduit 37 which is telescopically fitted into the upper end of the sectional extension conduit 38 coupled by union 9 and provided at its lowermost or discharge end with a float valve and also a strainer 39. The lower portion of the sectional conduit 38 is provided with gripping faces 8 so as to facilitate the use of wrenches, etc., in the tightening of the union 9. The float valve consists of an inner valve sleeve member 40 sweated at its upper end to the discharge end of the conduit 38 and sealed at its lower end by a closure cap and valve sleeve stop 41. The sleeve 40 is provided intermediate its ends with valve ports 42.

The outer reciprocable sleeve member 43 is provided intermediate its ends with discharge ports 44 which in certain positions of vertical adjustment of the sleeve 43 may be moved into and out of registry with the complementary ports 42 in the inner sleeve element 40. The adjustment or movement of the outer reciprocable sleeve member 43 depends upon the lift exerted thereon by the liquid in the reservoir 14 as it buoys the float element 45 fixed to the outer sleeve 43.

The air is withdrawn from the interior of the reservoir 14 sealed by the closure 16 to partially evacuate the enclosed space. The evacuation is brought about through conduit 46 by suction pump 47. The conduit 46 is connected to a discharge fitting 48 of the stationary member 49 of the sealed rotary coupling mechanism.

The air, in being withdrawn from the sealed reservoir 14, passes into conduit 46 after first passing through the interior of the rotary tubular member 50 of the rotary coupling mechanism. The element 50 extends through the central aperture of the reservoir closure 16 and is welded or otherwise satisfactorily sealed to the adjacent edges of the central aperture whereby it is supported upon the closure 16. The rotary tubular element 50 is sealed at both ends as is later to be described.

The air enters the tubular member 50 from the sealed reservoir 14 through the apertures 51 in the lower portion of the tubular element 50 which extends into the sealed space of the reservoir 14 through the closure 16. The air passes out of the tubular element 50 and into the channel 52 of the stationary rotary coupling element 49 through apertures 53 in the upper portion of the tubular element 50 which extends above the closure 16. The upper portion of the tubular element 50 in which the apertures 53 are located is defined and wholly located within the outer walls 54 of the channel 52 which are sealingly swiveled to the outer periphery of the said top portion of the tubular element 50 which is positioned above the closure 16.

The lower open end of the rotary tubular element 50 is sealed by flange 55 fixed to and extending outwardly from the conduit 38 immediately below the lower extremities of the element 50. The flange 55 does not contact the end of the element 50 and is provided with an upwardly turned edge 56 positioned outwardly of the outer periphery of the lower end of the element 50, thereby forming with the flange 55 a cup-like structure into which the end of the element 50 extends.

In normal operation the cup-like structure formed by the flange 55 and its upwardly turned edge 56 fills with liquid, thereby constituting a liquid seal between the lower end element 50 and the closure therefor formed by the flange 55 and its upwardly turned edge 56. The depth of the cup so formed measured from the upper edge of 56 to the lower edge of the element 50 is sufficient so that, when filled with liquid, the difference in pressure between the partially evacuated space in the top of the sealed reservoir 14 and the reduced pressure on the interior of the tubular element 50 will not be great enough to withdraw the liquid from the cup so formed.

The construction of the flange 55 and its upwardly turned edge 56 which forms a cup-like element somewhat larger in diameter than the lower portion of the element 50 is particularly desirable in view of the fact that the flange 55 is fixed to the non-rotating conduit 38 and the element 50 is fixed to the rotating closure 16, thereby allowing for substantial disalinement of the conduit 38 and the element 50 through which conduit 38 extends. However, depending on the accuracy of the alinement of the end of the supply pipe 37 and the element 50 fixed in the central aperture of the closure 16, the conduit 38 being telescoped onto the end of the fixed supply conduit 37 may also be slightly out of alinement. With such possibilities of slight disalinement in view it is advisable to have the diameter of the flange 55 sufficiently great so as to permit slight eccentric relative rotation between the element 50 and the closure for the lower end thereof formed by the flange 55 and its upwardly turned edge 56 which, when filled with liquid, constitutes a liquid seal for the end of the element 50.

The upper end of the rotary tubular element 50 of the rotary coupling is sealed by a resilient annular gasket element 57 which at its outer edge sealingly engages the outer periphery of the upper stationary channel wall 54 which rotatively and sealingly engages the upper extremity of the rotary element 50 and extends slightly thereabove to engage the gasket element 57. The inner edge of the annular resilient gasket element 57 sealingly engages the sleeve-like gasket supporting element 58 sweated onto the upper end of the conduit 38 with the end of the conduit flush with the end of the sleeve 58.

The lower end of the sleeve is provided with a channel 59 to engage the lower inner face of the annular gasket 57 which is compressed thereagainst by a compression element 60 threaded to the outer periphery of sleeve 58 and engaging the entire upper surface of the gasket 57 to thereby also compress the outer portions of the gasket 57 against the upper channel wall 54. The compression element 60 is provided with a depending skirt 61 which acts as a condensate deflector and guard element to substantially enclose the gasket 57. To seal the point of juncture between the end of the supply conduit 37 telescoped into the conduit 38, an annular compressible gasket 62 is superimposed over supply conduit 37 and seated upon the flush upper end faces of the conduit 38 and the sleeve 58. The gasket 62 is compressed into sealing engagement with the outer wall of the conduit 37 and the flush ends of the conduit 38 and sleeve 58 by a gasket confining and compressing element 63 threaded onto the upper end of the sleeve 58.

In the passage of the air from the reservoir 14 sealed by closure 16 it is desirable to avoid entraining any foam or small quantities of liquid which may be present in the reservoir. Such foam or entrained liquid, as previously pointed out, may be formed or entrained as a result of the vesiculated air in the liquid supplied to the reservoir which will cause foaming under conditions of reduced pressure or as a result of the liquid drawn into the partially evacuated reservoir through the vent tubes 27 from the containers or bottles 64 being filled.

To prevent the entrainment of foam or small quantities of liquid in the exhaust air rapidly flowing through the apertures 51 in the lower portion of the tubular element 50 of the rotary coupling, a centrally apertured upwardly dished baffle element 65 is removably sealed to the lower outer periphery of the rotary element 50 below the apertures 51 therein.

The outer edges of the upwardly dished baffle element 65 extend upwardly and outwardly into engagement with or immediately adjacent to the under side of the closure 16. By this construction the discharge apertures 51 in the element 50 are enclosed between the closure 16 and the baffle element 65 in the upper portion of the partially evacuated sealed space in the top of the sealed reservoir 14. To permit the air being exhausted from the sealed reservoir 14 to pass out through the apertures 51 in element 50, apertures 66 are provided in the outer and uppermost portions of the upwardly dished baffle element 65. By this construction air entering through the apertures 66 in baffle 65 will be withdrawn from the uppermost portion of the reservoir 14 where there is the least likelihood of entraining foam or small quantities of liquid. With the exception of the possible small spaces intermediate the outermost edge of the baffle 65 and the closure 16, the apertures 66 in the baffle 65 provide the only means of escape of air from the sealed space in the reservoir 14 to the tubular discharge element 50.

The upper outer edge of the baffle 65 very nearly engages the under side of the closure 16, thereby preventing any appreciable upward motion of the baffle 65. Downward motion of the baffle 65 is prevented by the engagement of the baffle 65 with a clip ring 67 mounted in a complementary groove of which several are provided for adjustment purposes in the outer periphery of the lower extremity of the rotary element 50 to which the baffle element 65 is sealed.

It should be noted that, as illustrated in Figure 2, liquid, when being discharged from vent tubes 27 into the reservoir 14, is, due to its velocity, frequently impinged against the lower surface of the closure 16. To prevent small quantities of such liquid from being entrained or drawn into the apertures 66 in baffle 65, a depending skirt 68 is provided to guard the entrance to the apertures 66. However, the likelihood of ready entrainment of foam or small quantities of liquid by the air passing into apertures 66 is not very great due to the fact that the velocity of the air passing thereinto is comparatively low.

It has been one of the objects of this invention to so proportion the total area of the apertures 51 through which the evacuated air may flow to the total area of the apertures 66 that the gas will flow through the latter apertures at a greatly reduced speed due to the greatly increased total area of the combined apertures 66. By virtue of this arrangement air is withdrawn from the enclosed reservoir 14 from a portion thereof most remote from that portion where foam or small quantities of liquid may be entrained. The air is also withdrawn from these areas at a relatively low velocity so as to further minimize the likelihood of entraining foam or small quantities of liquid in the evacuated air.

The liquid for reservoir 14 is supplied to the supply conduit 37 from a liquid cooler 69 which discharges into a liquid collecting trough 70 from where the liquid is conducted through conduit 71 to an air separator and liquid seal from where the liquid is withdrawn by the supply conduit 37 and conducted into the reservoir 14.

The air separator and liquid seal consists in its preferred form of an enclosed liquid reservoir comprised of a base 72 having a depressed upper surface to which a cylinder 73 is sealingly clamped. Cylinder 73 is closed at its upper end and is provided with an admission port 74 associated with the end of the conduit 71, an entrance port 75 for the conduit 37, which latter conduit extends through the entire length of the cylinder 73, and an air exit in the upper end thereof to which is fixd an air vent tube 76. To the depressed base is coupled a draincock 77 for draining the contents of the cylinder 73 when the apparatus is not in use.

The capacity of the cylinder 73 is such that the liquid discharged into the upper portion thereof from the conduit 71 may be retained in the cylinder for a short period of time while the bottle filling apparatus is in operation to thereby permit the separation of a portion of the air entrained in the liquid before passage thereof through conduit 37 into the reservoir 14. The air so separating out of the liquid within the air trap passes out into the atmosphere through the vent pipe 76. The air so escaping from the liquid before the liquid is supplied to the reservoir 14 prevents the entrance of the air while entrained in the liquid into the partially evacuated reservoir 14 where it would cause a substantial foaming of the liquid within the partially evacuated bowl due to the expansion of the entrained air. The vent tube 76, by conducting the air separating out of the liquid coming from the cooler 69 into the atmosphere prevents the air trap from becoming airbound.

The liquid seal which is comprised of the cylinder 73 and the end of the conduit 37 which extends thereinto is of such a depth and so positioned with respect to the reservoir 14 and the float valve therein that the maximum condition of vacuum which exists within the reservoir 14 will not be sufficiently great to break the liquid seal. Such an effect is secured by having the cylinder 73 of such a depth and so positioned with respect to the float valve within the reservoir 14 that the height of the column of liquid in the portion of the supply conduit 37 extending into the cylinder 73, when measured from the highest point A of the conduit to the level of the liquid in the cylinder 73, is sufficiently greater than the height of the column of liquid extending from point A to the float valve in the reservoir 14 to assure the desired seal, as above stated. By this arrangement the supply conduit 37 through which liquid is supplied to the reservoir 14 will always remain sealed by liquid and filled with liquid, thereby preventing the admission of air into the supply reservoir through conduit 37.

The above condition must, of course, also be true in any condition of adjustment of the reservoir 14 for the filling of tall or short containers. In this connection it should be noted that the adjustment of the elevation of reservoir 14, which is normally accomplished by the conventional arrangement of handwheels or cranks 78 and suitable connecting mechanism, such as a worm and gear, between the cranks and the adjustable support 13, concurrently and automatically effects a relative adjustment of the elevation of the float valve mechanism within the reservoir 14. This is accomplished by virtue of the arrangement whereby the float valve mechanism is supported through gasket 57 and stationary element 49 upon the rotary element 50 of the rotary coupling mechanism which is supported on and fixed to the reservoir closure 16 which moves with the reservoir 14 while the latter is adjusted in elevation.

During the adjustment of the reservoir 14 any necessary relative adjustment of the air exhaust conduits is provided for by a series of swiveled sanitary couplings to which the ends of the conduits 46 are attached. The swiveled sanitary couplings, of which there are three, in the air exhaust conduit 46 thereby enable the accommodation of the adjustment of the reservoir 14 without binding or bending the sections of the conduit 46. These couplings are formed of two abutting coupling elements 79 and 80.

The element 79, as shown in Figure 4, is provided with a socket 81 into which one end of the element 80 is swiveled. The flange 82 on the outer periphery of the element 80 is urged toward the adjacent end of the element 79 by the tightening of a coupling nut 83 which is provided with an inwardly extending flange 84 overlapping and engaging flange 82 on the element 80. To seal the swiveled sanitary coupling arrangement a resilient annular gasket 85 is compressed between the end of the coupling element 79 and an antifriction washer 86 abutting against the flange 82 by tightening the coupling nut 83.

In the operation of the container filling apparatus the liquid to be filled is supplied from cooler 69 to collecting trough 70 and then passes through conduit 71 into cylinder 73 from whence it passes through conduit 37 into the reservoir 14. In the event the operation of the filling apparatus is temporarily halted without also discontinuing the flow of milk over the cooler 69, it is obvious that the cylinder 73, the conduit 71 and the collecting trough 70 will be gradually filled. To prevent the discharge of liquid from the vent pipe 76 in the air seal mechanism in the liquid supply conduits during such time of temporary shutdown, it is desirable to have the height of the vent pipe 76 sufficient to prevent the discharge of the liquid from the end thereof even when the liquid rises to the maximum level in the collecting trough 70.

In the normal operation of the invention, as illustrated by the apparatus as set forth above, the liquid supplied to the air trap and liquid seal from the conduit 71 comes to a temporary rest or at least is substantially slowed down in its passage toward the reservoir 14 so as to permit the separation therefrom of a substantial portion of the air normally entrained in the flow of the liquid from the cooler 69 into the trough 70 and conduit 71. The entrained air so separated then escapes to the atmosphere through the vent tube 76 thereby preventing the passage of such entrained air through conduit 37 into the reservoir 14 in which, due to the condition of partial evacuation existing in the enclosed reservoir, the entrained air would normally cause a substantial foaming of the liquid in the reservoir which is a disadvantage common in the present type of combined gravity-vacuum fillers.

In the filling of the liquid from the partially evacuated reservoir 14 into the containers 64 which, during the rotation of the reservoir 14, are brought into sealing engagement with the temporary closures of the bottle filling valve mechanism, the atmospheric air in the containers 64 is first evacuated therefrom before liquid will flow from reservoir 14 into the containers 64. Such evacuation is effected through the open vent tubes 27 which extend down through the apertured valve 26.

In the event that the containers 64 are not completely sealed to the temporary closure 25 of the bottle filling valve mechanism, sufficient air usually leaks through such defective seal into the containers 64 so as to prevent the partial evacuation thereof and thereby also prevent the filling of liquid from the reservoir 14 into the defective containers which cannot be partially evacuated. This prevention of flow of liquid into the defective containers is effected by the maintenance of a sufficient degree of vacuum within the enclosed reservoir so as to prevent the flow of liquid from an open valve in the bottom of the reservoir when opened to substantially atmospheric pressure.

When, however, a satisfactory seal is secured between the containers 64 and the temporary closure 25 of the filling valve mechanism and the containers in all other respects are satisfactorily sealed, they become partially evacuated by the withdrawing of the air therefrom through the vent tubes 27 into the partially evacuated reservoir 14. Upon the opening of the filling valve mechanism, the liquid will then be discharged from reservoir 14 into the containers 64 by a gravity flow thereof due to a substantial equalization of the pressure within the containers 64 and the reservoir 14.

As, however, is always obvious in the filling of cold liquid from uninsulated reservoirs, condensate collects on the reservoir and on the exposed portions of the filling valve and frequently portions thereof drain over the filling valve mechanism. When such a filling valve consists of telescoping sleeves, condensate may sometimes enter into the valve through such telescoping sleeves especially when the pressure on the outside of the sleeves is greater than the pressure on the interior thereof. To prevent the possible passage of condensate or other foreign matter into the interior of the sleeve and also to substantially protect the space occupied by the containers as they pass to and from the filling valve, the elastic, collapsible sleeve 33 satisfactorily seals the valve mechanism and in its deformed condition provides a protective covering for the filling mechanism.

The invention, as disclosed in its preferred embodiment, is easily adapted to the conventional type of automatic rotary bottle filling apparatus having a cylindrical tank and provided with venting valve mechanisms. By virtue of such easy adaptability the invention provides a great improvement in automatic filling apparatus which can be made available at a comparatively small cost to the user.

Having thus described this invention and certain specific embodiments thereof, setting forth certain of the improved features and advantages thereof, it is desired to point out that the invention is probably subject to various modifications as to form and details of construction. Accordingly, it is not desired to limit this invention to the specific disclosure except in so far as set forth in the following claims.

We claim:

1. In a device of the type described, a closed reservoir for liquid having an aperture in the lower portion thereof, a valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, and an air trap in said liquid supply means for separating entrained air from the liquid being supplied to said reservoir.

2. In a device of the type described, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, and baffle means within said reservoir substantially encompassing the connection to said reservoir of said means for partially evacuating said reservoir.

3. In a device of the type described, a closed reservoir for liquid, valve means for controlling the flow of liquid from said reservoir into a container to be filled with liquid, means for supplying liquid into said reservoir, and means connected to said reservoir for partially evacuating said reservoir and for partially evacuating said container when in position to be filled by said valve means, said valve means including telescoped sleeves and a sealing envelope for said sleeves having a condensate deflector about its outer periphery.

4. In a device of the type described, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, and a liquid seal in said supply line of sufficient depth to prevent the breaking of said seal by the vacuum within the partially evacuated reservoir when said device is in operation.

5. A container filling apparatus comprising, in combination, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, an air trap in said liquid supply means for separating entrained air from the liquid being supplied to said reservoir, and baffle means within said reservoir substantially encompassing the connection to said reservoir of said means for partially evacuating said reservoir, whereby the formation of foam within said reservoir and the passage of foam from the reservoir into the means for evacuating the reservoir is substantially prevented.

6. In a combined gravity-vacuum container filling apparatus, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir and for partially evacuating said container when in position to be filled by said valve means and for continuing to evacuate said container during the flow of liquid from said reservoir into said container, and an air trap in said liquid supply means for separating entrained air from the liquid being supplied to said reservoir, said valve means including telescoped sleeves and a sealing envelope for said sleeves.

7. A device of the type described comprising, in combination, a closed reservoir for liquid having an aperture in the lower portion thereof, valve means for controlling the flow of liquid from said reservoir through said aperture into a container to be filled with liquid, means for supplying said liquid into said reservoir, means connected to said reservoir for partially evacuating said reservoir, means for partially evacuating said container when in position to be filled by said valve means and for continuing to evacuate said container during the flow of liquid from said reservoir into said container, and an air trap and liquid seal in said liquid supply means for separating entrained air from the liquid being supplied to said reservoir, said liquid seal in said supply line being of sufficient depth to prevent breaking thereof by the vacuum in the partially evacuated reservoir.

8. In a device of the class described, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, an air trap in said liquid supply means for separating entrained air from the liquid being supplied to said reservoir, and baffle means within said reservoir substantially encompassing the connection to said reservoir of said means for partially evacuating said reservoir, said valve means including telescoped sleeves and a sealing envelope for said sleeves.

9. In a container filling apparatus, the combination of a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, an air trap and liquid seal in said liquid supply means for separating entrained air from the liquid being supplied to said reservoir, and baffle means within said reservoir substantially encompassing the connection to said reservoir of said means for partially evacuating said reservoir, said liquid seal in said supply line being of sufficient depth to prevent breaking thereof by the vacuum within the partially evacuated reservoir.

10. A device comprising, in combination, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, and an air trap and liquid seal in said liquid supply means for separating entrained air from the liquid being supplied to said reservoir, said liquid seal in said supply line being of sufficient depth to prevent breaking thereof by the vacuum within the partially evacuated reservoir, said valve means including telescoped sleeves and a sealing envelope for said sleeves.

11. In combination, a closed reservoir for liquid, valve means for controlling the flow of liquid from said reservoir into a container to be filled with liquid, means for supplying liquid to said reservoir, means connected to said reservoir for partially evacuating said reservoir, means for partially evacuating said container when in position to be filled by said valve means, and baffle means within said reservoir substantially encompassing the connection to said reservoir of said means for partially evacuating said reservoir, said valve means including telescoped sleeves and a sealing envelope for said sleeves.

12. A bottle filler comprising, in combination, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, baffle means within said reservoir substantially encompassing the connection to said reservoir of said means for partially evacuating said reservoir, and a liquid seal in said supply line of sufficient depth to prevent breaking thereof by the vacuum within the partially evacuated reservoir.

13. A combined gravity-vacuum bottle filling apparatus comprising, in combination, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, baffle means within said reservoir substantially encompassing the connection to said reservoir of said means for partially evacuating said reservoir, and a liquid seal in said supply line of sufficient depth to prevent breaking thereof by the vacuum within the partially evacuated reservoir, said valve means including telescoped sleeves and a sealing envelope for said sleeves.

14. In a combined gravity-vacuum bottle filling apparatus, the combination of a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, and a liquid seal in said supply line of sufficient depth to prevent breaking thereof by the vacuum within the partially evacuated reservoir, said valve means including telescoped sleeves and a sealing envelope for said sleeves.

15. A combined gravity-vacuum bottle filling apparatus comprising, in combination, a closed reservoir for liquid having an aperture in the lower portion thereof, valve means for controlling the flow of liquid from said reservoir through said aperture into a container to be filled with liquid, means for supplying liquid into said reservoir, means connected to said reservoir for partially evacuating said reservoir, means for partially evacuating said container when in position to be filled by said valve means and for continuing to evacuate said container during the flow of liquid from said reservoir into said container, an air trap and liquid seal in said liquid supply means for separating entrained air from the liquid being supplied to said reservoir, and baffle means within said reservoir substantially encompassing the connection to said reservoir of said means for partially evacuating said reservoir, said liquid seal in said supply line being of sufficient depth to prevent breaking thereof by the vacuum within the partially evacuated reservoir, said valve means including telescoped sleeves and a sealing envelope for said sleeves.

16. A combined gravity-vacuum bottle filling apparatus comprising, in combination, a base, a closed liquid reservoir rotatably mounted upon said base, means for axial adjustment of the elevation of said reservoir with respect to said base, means for rotating said rotatable reservoir, means for continuously supplying liquid into said reservoir, means connected to said reservoir for continuously causing a partial evacuation of the space within the closed reservoir, and a float valve sealed to the end of said means for supplying liquid into said reservoir and positioned within said reservoir, said float valve and liquid supply means being detachably fixed to said assembled reservoir and closure therefor for automatically adjusting the elevation of said float valve with respect to the elevation of said reservoir upon the axial adjustment of the elevation of the said reservoir.

17. A combined gravity-vacuum bottle filling apparatus comprising, in combination, a rotatable reservoir for liquid, a centrally apertured closure for said reservoir, a tubular element extending through said aperture in said closure and sealed to said closure, said tubular element having apertures in its wall above and below said closure, sealing means for the ends of said tubular element, a channeled sleeve swiveled to the upper end of said tubular element extending above said closure and superimposed over the apertures in said tubular element above said closure, and baffle means co-acting with said closure to substantially envelop the apertures in said tubular element below said closure.

18. A combined gravity-vacuum bottle filling apparatus comprising, in combination, a rotatable reservoir for liquid, an apertured closure for said reservoir, tubular means extending through said aperture in said closure and sealed to said closure for partially evacuating said reservoir, means for supplying foamable liquid into said reservoir, said tubular means having apertures in its wall above and below said closure, sealing means for the ends of said tubular means, means swiveled to the upper end of said tubular means extending above said closure and overlapping said apertures in the upper end of said tubular means, said swiveled means having passage means continuously communicating with the apertures in the upper end of said tubular means, apertured baffle means co-acting with said closure to substantially envelop the apertures in said tubular means below said closure, said baffle means at its outer periphery contacting said closure, and a skirt depending from the outer periphery of said baffle means to prevent the ready passage of foam into the apertures in said baffle means and to bring about the rapid disintegration of foam contacting said skirt.

19. A combined gravity-vacuum bottle filling apparatus comprising, in combination, a reservoir for liquid, an apertured closure for said reservoir, means extending through said aperture and sealed to said closure for extracting air from within the reservoir, said means having an aperture for the passage of air from said reservoir into said means, and a baffle in said closed reservoir for substantially enveloping the aperture in said means.

20. A gravity-vacuum container filling apparatus comprising, in combination, a reservoir for liquid to be filled into containers, a valve means for controlling the flow of liquid from said reservoir into a container to be filled with liquid, a closure for said reservoir, means for supplying foamable liquid into said reservoir, means connected to said reservoir for partially evacuating said reservoir, means for partially evacuating said container when in position to be filled by said valve means, and baffle means within said reservoir substantially encompassing the connection to said reservoir of said means for partially evacuating said reservoir and positioned adjacent the closure for said reservoir, whereby the gas withdrawn from said reservoir to partially evacuate the same must first pass around said baffle before entering said means for evacuating said reservoir thereby providing an arrangement in which the evacuated gas leaves the reservoir at comparatively low velocity and from a point in said reservoir at which liquid foam is not readily entrained.

21. A gravity-vacuum container filling apparatus comprising, in combination, a reservoir for liquid to be filled into containers, a valve means for controlling a flow of liquid from said reservoir into a container to be filled with liquid, a closure for said reservoir, means for supplying foamable liquid into said reservoir, means connected to said reservoir for partially evacuating said reservoir, and for partially evacuating said container when in position to be filled by said valve means and including a vent tube extending into said reservoir to a point above the level of the liquid therein, baffle means within said reservoir substantially encompassing the connection to said reservoir of said means for partially evacuating said reservoir and positioned adjacent the closure for said reservoir, skirt means depending from said baffle means in close proximity to the end of said vent tube, whereby the gas withdrawn from said container to partially evacuate the same and entrained liquid particles or foam will engage the skirt of said baffle means thereby substantially preventing the ready entrance of foam and liquid into the space substantially enclosed by said baffle means, and means for evacuating said reservoir having a connection thereto substantially encompassed by said baffle means, whereby the foam entrained in the gas passing through said vent tube and engaged against the skirt of said baffle means is promptly broken up and redirected in the form of flowable liquid into the lower portion of the reservoir.

22. A combined gravity-vacuum bottle filling apparatus comprising, in combination, a rotatable reservoir for liquid, an apertured closure for said reservoir, tubular means extending through said aperture in said closure and sealed to said closure for extracting air from within said reservoir, said tubular means having an aperture for the passage of air from said reservoir into said tubular means, a baffle in said closed reservoir for substantially enveloping the aperture in said tubular means, and a liquid seal for sealing the lower extremity of said tubular means extending into said closed reservoir.

23. In a device of the type described, a closed reservoir for liquid having an aperture in the lower portion thereof, a valve means for controlling the flow of liquid from said reservoir into a container through said aperture to be filled with liquid, conduit means for supplying liquid into said reservoir, means connected to said reservoir for partially evacuating said reservoir and for partially evacuating said container when in position to be filled by said valve means and for continuing to evacuate said container during the flow of liquid from said reservoir into said container, and an air trap connected to said liquid supply conduit means and positioned at an elevation lower than said reservoir for separating entrained air from the liquid being supplied to said reservoir, said air trap comprising a vented chamber for temporarily storing a quantity of liquid having a liquid supply means connected to the top of said chamber and having said conduit means extending into said chamber in close proximity to the bottom thereof, whereby entrained air in the liquid supplied to said air trap may separate from said liquid while being temporarily stored in said chamber and escape to the atmosphere from said vented chamber.

24. A device in accordance with claim 23 in which the chamber is provided with a venting means so constructed and arranged as to avoid the escape of liquid therefrom during the operation of said device.

25. In a gravity-vacuum container filling apparatus, a closed reservoir for liquid, means for partially evacuating the gas from said reservoir, means for supplying liquid to said reservoir, and a liquid trap in said supply means, said liquid trap being so constructed and arranged as to continuously maintain said liquid supply means sealed by a liquid seal during the normal operation of said filling apparatus, said liquid seal being of such capacity in proportion to the vacuum within said reservoir as to not be subject to breaking during the normal operation of said filling apparatus.

26. In a bottle filling apparatus of the class described, a closed reservoir for liquid, means for supplying liquid to said reservoir, means for partially evacuating said reservoir, valve means for controlling the flow of liquid from said reservoir into a container to be filled with liquid, said valve means including telescopic sleeves, and a sealing envelope sealed to and enclosing said telescoped sleeves about the line of juncture thereof and having a condensate deflector about its outer periphery.

27. In a valve means for a filling apparatus, a liquid conduit comprised of telescoped sleeves communicating with a reservoir for a bottle filling apparatus, a valve means to close one end of said telescoped sleeves, a sealing envelope superimposed over the juncture of said telescoped sleeves having an end sealed to each of said sleeves, and a flange means on the interior of said sealing envelope immediately adjacent one end thereof to engage the outer periphery of the one of said sleeves, whereby upon the movement of said telescoped sleeves to open said valve said sealing envelope will be maintained in relative position on said sleeves primarily by the engagement of said flange means with the outer periphery of one of said sleeves.

28. In a valve for a bottle filling apparatus, an enclosing tubular elastic envelope adapted to expand outwardly at its mid-section upon axial compression of the tubular envelope, and an annular resilient collar carried by said envelope on the outer periphery of its mid-section, whereby upon the compression of said envelope, said envelope and said collar will form a substantial coverage for the space immediately below said valve.

29. In a gravity-vacuum bottle filling apparatus, a closed reservoir for liquid, means for supplying liquid into said reservoir, sectional conduits connected to said reservoir by swiveled couplings joining the adjacent ends of the sectional conduits for partially evacuating said reservoir, said couplings comprising a female element and a male element swiveled therein, a flange on said male element opposed to the outer periphery of said female element having a gasket and antifriction means interposed therebetween, and means for urging said flange means toward said female element to compress said gasket element to seal said swiveled couplings, whereby free adjustment of the elevation of said reservoir may be made without disconnecting said sectional conduits.

CHARLES F. WEINREICH.
ADOLPH J. LIPPOLD.

CERTIFICATE OF CORRECTION.

Patent No. 2,349,780. May 23, 1944.

CHARLES F. WEINREICH, ET AL.

It is hereby certified that error appears in the printed specification of the above numbered patent requiring correction as follows: Page 9, first column, line 1, claim 21, after the word "reservoir" second occurrence, strike out the comma; lines 42 and 43, claim 23, for "reservoir into a container through said aperture" read --reservoir through said aperture into a container--; and that the said Letters Patent should be read with this correction therein that the same may conform to the record of the case in the Patent Office.

Signed and sealed this 1st day of August, A. D. 1944.

(Seal)

Leslie Frazer
Acting Commissioner of Patents.